United States Patent Office 3,265,744
Patented August 9, 1966

3,265,744
PRODUCTION OF DIHALOCARBENE ADDUCTS
Gene C. Robinson, Baton Rouge, La., assignor to Ethyl Corporation, New York, N.Y., a corporation of Virginia
No Drawing. Filed Sept. 7, 1962, Ser. No. 222,173
8 Claims. (Cl. 260—648)

The present invention pertains to a novel process involving the generation of dihalocarbene and the proximate formation of dihalocarbene adducts.

The prior art discloses several methods for the generation of dihalocarbene and the formation of dihalocarbene adducts, for example, the reaction of metallic potassium and tertiary butyl alcohol followed by the reaction with chloroform in the presence of cyclohexene. Although the reported yield of dichloronorcarane is quite good—59 percent—this procedure requires the use of expensive reagents. Another method comprises reacting potassium hydroxide and chloroform in an aqueous medium and in the presence of cyclohexene. The reported yield of dichloronorcarane was 0.55 percent. For further discussion see "The Addition of Dichlorocarbene to Olefins" by Doering and Hoffman, Journal of the American Chemical Society, vol. 76, 1954, page 6162 et seq.

An examination of the prior art will disclose that the previously known processes are generally characterized by low yields or the use of expensive reagents. Accordingly, it is an object of this invention to provide the art with a novel process involving the generation of dihalocarbene which is attractive both from the standpoint of yields obtained and process economics.

This object is accomplished by reacting together a mixture comprising an alkali metal hydroxide, a haloform, and a dihalocarbene acceptor in a cyclic sulfone solvent. The aforesaid reagents and solvent, as initially charged into the reaction zone are to be essentially anhydrous. In other words, an aqueous solvent is not employed in the present process, and more importantly, the reaction system is essentially anhydrous at the outset. This latter feature appears to enable the reaction to commence. Once the reaction has started, the halocarbene produced appears to react so quickly with the halocarbene acceptor which is co-present that it is unnecessary to remove the by-product water from the reaction scene.

The yields of the desired adducts produced pursuant to this invention have reached higher than 70 percent. It definitely appears that the sulfone solvent is at least partly responsible for these very beneficial results. Furthermore, these good yields are achieved utilizing cheap and readily available reactants. It is interesting to compare these results with the 0.55 percent yield reported by Doering and Hoffman who attempted to make use of potassium hydroxide as a basic reagent in a dihalocarbene synthesis.

When carrying out the process of this invention it is necessary to employ initially essentially anhydrous reagents and solvent. A distinctly preferred embodiment of this invention is to employ a means to minimize the effect of water which may initially be present as a trace impurity in the reagents and solvent and also the water which is generated by the reaction itself. A wide variety of methods may be employed to effect this result. An excellent method is to add an excess of the alkali metal hydroxide to the reaction system in order to reduce the effective water concentration. Of course, when desired, other desiccants which are inert to the reaction mass may be added thereto, e.g., silica gel, asbestos, charcoal, and the like. Another desirable method is reflux drying which is accomplished either by gravimetric entrapment of the water in the reflux return or by bringing the reflux vapors into contact with a desiccant or both. Materials which may be used to dry the reflux are phosphorus pentoxide, magnesium perchlorate, alkali and alkaline earth metal hydroxides, aluminum oxide, sulfuric acid, magnesium oxide, beryllium perchlorate, calcium oxide, calcium bromide, calcium chloride, zinc chloride, zinc bromide, copper sulfate, silica gel, charcoal, asbestos, and the like. Excellent results are achieved when both reflux drying and an in situ desiccant is employed. A preferred embodiment of this einvention both from the standpoint of simplicity and economics comprises the use of an excess of the metal hydroxide reagent as the in situ desiccant.

The alkali metal hydroxides to be employed in this process are lithium hydroxide, sodium hydroxide, potassium hydroxide, rubidium hydroxide, and cesium hydroxide. These alkali metal hydroxides may be employed individually or in admixture. The preferable hydroxides for this reaction are sodium hydroxide and potassium hydroxide. With regard both to optimum reactivity and cost effectiveness the use of sodium hydroxide is a particularly preferred embodiment of this invention.

The metal hydroxide reagent may be employed in stoichiometric quantities, i.e., a molar ratio of hydroxide to haloform of 1:1, however, it is preferred that an excess be used due both to the desirability of decreasing the effective concentration of water generated by the reaction and and to insure the efficient consumption of the haloform. An effective molar ratio of the hydroxide to the haloform is within the range of from about 1.5:1 to about 5:1. A particularly effective molar ratio is from about 2:1 to about 4:1.

It is preferred, though not required, that the metal hydroxide be employed in finely divided form (i.e., the average particle size should range from about 50 to about 500 microns). This can be accomplished in situ by high speed stirring or the hydroxide as initially charged can be finely divided.

The haloforms which are to be used in this reaction are those having at least 1 atom of chlorine or bromine. Examples of these haloforms are chloroform, bromoform, dichlorobromoform, dibromochloroform, difluorochloroform, dichlorofluoroform, dibromofluoroform, diiodochloroform, dichloroiodoform, diiodobromoform, chlorobromoiodoform, fluorochloroiodoform, fluorobromoiodoform, and the like. The various haloforms mentioned above may be used individually or in admixture in this process, however, particularly from the commercial standpoint, chloroform and bromoform are preferred. The use of chloroform in all respects is very advantageous.

As was stated above, a cyclic sulfone solvent is to be the reaction medium for the process of this invention. Whereas a wide variety of cycloparaffinic sulfones may be used to advantage in this invention, it has been discovered that the ratio of carbon atoms to sulfone groups in the molecule has a significant effect and if maximum yields and short reaction times are to be achieved it is recommended that the sulfone solvent chosen has a carbon atom to sulfone group ratio of less than about 10:1. Examples of these sulfones are trimethylene sulfone, tetramethylene sulfone, pentamethylene sulfone, hexamethylene sulfone, octamethylene sulfone, decamethylene sulfone, and the like. Sulfones having alkyl substituted rings may also be used, e.g., 3-methyl-1-thiacyclopentane-1,1-dioxide; 3-methyl - 4 - ethyl - 1 - thiacyclopentane-1,1-dioxide; 3,4 - methyl - 1 - thiacyclopentane - 1,1-dioxide; 4-methyl - 1 - thiocyclohexene - 1,1-dioxide; and the like. It is recommended that the branched chains in the substituted sulfones have no more than 5 or 6 carbon atoms and preferably no more than 2 or 3. Sulfones containing a multiplicity of sulfone groups in the ring may likewise be employed, for example 1,4 - dithiacyclohexane-1,1,4,4-tetraoxide, and the like. Cyclic sulfones containing unsaturated carbon to carbon bonds may also be used, e.g., 3,4-ene-3-methyl-1-thiacyclopentane - 1,1 - dioxide, thianaphthalene dioxide, and the like, however, due to the fact that carbon to carbon multiple bonds serve generally as dihalocarbene acceptors, these sulfones would be used only when they are also the desired acceptor.

Of the above described group, sulfones having a ratio of carbon atoms to sulfone group of less than about 8:1 are preferred and especially those having a ratio of carbon atoms to sulfone groups of from about 3:1 to about 6:1. An exceptionally preferred sulfone due both to yields obtained and process economics is tetramethylene sulfone.

The use of the above described sulfone solvents and particularly the preferred solvents is a unique feature of this invention in that it has proven to dramatically increase yields and reaction rates. In other words, the sulfone serves as a catalyst as well as a solvent. In demonstration of this, when this process is carried without a sulfone solvent the yields range up to 45 percent and the reaction period is in the range of 10 to 14 hours whereas when a sulfone solvent is employed (e.g., tetramethylene sulfone) yields range up to 77 percent and usual reaction periods are in the neighborhood of 1.25 hours.

The quantity of sulfone solvent employed in relation to the quantity of hydroxide is significant and if best results are to be achieved it is recommended that the molar ratio of sulfone to hydroxide in the reaction system should be above about 0.1:1. A preferred molar ratio of sulfone to hydroxide has been found to be within the range of from about 0.5:1 to about 10:1. A particularly effective range is from about 1:1 to about 5:1.

The sulfone may be employed in this process either in pure form or it may be cut with other solvents which are inert to the reaction system. Examples of suitable solvents are hexane, heptane, cyclohexane, petroleum ether, petroleum spirit, kerosene, and the like. The exact concentration of sulfone in this solvent mixture is not too important as long as the molar ratio of sulfone to hydroxide remains within the ranges stated above. However, it is recommended that extreme dilution of the sulfone should be avoided and best results are achieved when the concentration of sulfone is above about 20 percent by volume of the mixture.

Due to the highly reactive nature of dihalocarbene it is desirable to react it proximately as formed with a material with which it is capable of forming an adduct. This is preferably accomplished in situ, i.e., charging the reactor initially with a dihalocarbene acceptor. The dihalocarbene acceptors cover a very wide range of chemical compounds and generally will comprise organic compounds having up to 25 or more carbon atoms containing the aliphatic double bond, the aromatic double bond in a condensed ring nucleus, the carbon to carbon triple bond, the carbon to nitrogen double bond, the carbon to nitrogen triple bond, and polymers having a multiple bond as part of the repeating unit. The following are exemplary of compounds capable of forming an adduct with dihalocarbene.

Ethylene, propylene, butene-1, cis-butene-2, trans-butene-2, isobutylene, diisobutylene, propylene trimer, propylene tetramer, cyclohexene, cyclooctene, cyclopentene, cyclooctadiene-1,5, cyclooctadiene-1,3, bicycloheptene, bicycloheptadiene, anethol, butadiene, isoprene, chloroprene, camphene, styrene, divinylbenzene, alpha-methylstyrene, propylbenzene, allylbenzene, biallyl, dicyclopentadiene, cyclopentadiene, methylcyclopentadiene, methylcyclopentadiene dimer, dihydropyran, dipentene, vinyl chloride, triisobutylene, vinyl butyl ether, vinyl ethyl ether, vinylidene chloride, alpha-pinene, beta-pinene, tetramethylene-2,5-dihydrofuran, diallylether, 4-methylpentene-1, pentene-1, pentene-2, 2-methylbutene-1, 2-methylbutene-2, 3-methylpentene-1, 3-methylpentene-2, hexene-1, hexene-2, octene-1, octene-2, octene-3, decene-1, dodecene-1, tetradecene-1, octadecene-1, hexadecene-1, cholestene, 4-vinylcyclohexene-1, acrolein diethyl acetal, 2-ethylhexene-1, indene, stilbene, dimethyl ketene, acetal, diethyl ketene acetal, vinylacetylene, 1-ethyl-1-butylethylene, glycerol triallyl ether, glycerol trivinyl ether, 1,5,9-cyclododecatriene, cyclooctatetraene.

Anthracene, 1-methoxynaphthalene, 2-methoxynaphthalene, 9-methoxyphenanthrene, phenanthrene, acenaphthylene.

Methyl amine, ethyl amine, propyl amine, allyl amine, ethanolamine, aniline, p-toluidine, m-toluidine, o-toluidine, alpha-naphthyl amine, beta-naphthyl amine, p-anisidine, cyclohexylamine.

Benzalaniline, benzalazine, diethylcarbodiimide.

Acetylene, methylacetylene, hexyne-3, butyne-1, butyne-2, phenylacetylene, cyclodecyne, diphenylacetylene.

Oleic acid, undecylenic acid, crotonic acid, cinnamic acid, methyl vinyl ketone, mesityl oxide, acrylic acid, methacrylic acid, acrylonitrile, benzalacetone, dibenzalacetone.

Allyl alcohol, crotyl, alcohol, methyl vinyl carbinol, cinnamyl alcohol, 3-butene-1-ol.

The nature and identity of a wide variety of dihalocarbene acceptors are known in the art. For instance, reference may be had to Journal of the American Chemical Society, vol. 76, page 6162 (1954), vol. 81, page 2579 (1959), vol. 83, page 603 (1961), vol. 82, page 4085 (1960).

Equimolar amounts of the dihalocarbene acceptor and the haloform may be employed, however, it is usually desirable to employ an excess of the acceptor. Generally, good results will be obtained when the molar ratio of acceptor to haloform is within the range of from about 1.5:1 to about 10:1. An excellent operating molar ratio is within the range of from 2:1 to about 5:1.

This process may be conducted at atmospheric pressure in an open vessel or an autogenous pressure in a closed vessel. When the dihalocarbene acceptor is a gas under the reaction conditions pressure will generally be required. The exact temperature for this process depends, of course, on the particular reagents used, generally, however, good results will be obtained when the temperature is within the range of from 0° C. to about 250° C. The recommended operating temperature range is from about 20° to about 110° C. In general, the reaction will be complete in from about 30 minutes to about 4 hours depending on the process conditions. Usually a reaction time of from about 30 minutes to about 1.25 hours is sufficient.

The following examples illustrate the process of this invention.

*Example I*

Into a dry reaction vessel equipped with a stirrer and a condenser was charged 25 milliliters of tetramethylene sulfone, 0.5 mole of chloroform, 0.25 mole of cyclohexene and 1.00 mole of sodium hydroxide in commercially available pellet form. The reagents and solvent were substantially anhydrous as initially charged into the reaction zone. The reaction mixture was heated to 95° C. and stirred slowly. The sodium hydroxide remained substantially in pellet form and a sufficient excess thereof had been charged to minimize the effect of the water generated by the reaction. The reaction was complete in 1.25 hours. The yield of dichloronorcarane was 77 percent.

*Example II*

Into the reaction vessel described in Example I was charged 25 milliliters of tetramethylene sulfone, 0.25 mole of chloroform, 0.25 mole of cyclohexane and 1.00 mole of sodium hydroxide in commercially available pellet form. The reagents and solvent were substantially anhydrous as initially charged into the reaction zone. The reaction mixture was heated to 90° C. with slow stirring. The sodium hydroxide remained substantially in pellet form and a sufficient excess thereof had been charged to minimize the effect of the water generated by the reaction. The reaction was complete in 1.50 hours and the yield of dichloronorcarane was 70 percent.

action by charging the reactor with a molar excess of sodium hydroxide over the moles of chloroform employed, the molar ratio of sodium hydroxide to chloroform thus being greater than 1:1.

TABLE.—SUMMARY OF EXAMPLES III–IX WHICH UTILIZE THE GENERAL PROCEDURES OF EXAMPLES I AND II

| Ex. | Sulfone | Hydroxide | Haloform | Acceptor | Temp. (° C.) | Time (Hrs.) | Adducts |
|---|---|---|---|---|---|---|---|
| III | 3-methyl-1-thiacyclopentane-1,1-dioxide. | NaOH | $CHCl_3$ | Tetramethyl ethylene. | 90 | 1.20 | 1,1-dichloro-2,2,3,3-tetramethyl cyclopropane. |
| IV | Octamethylene sulfone | KOH | $CHBr_3$ | Cyclohexene | 90 | 1.25 | Dibromonorcarane. |
| V | Tetramethylene sulfone | CsOH | $CHCl_3$ | Ethylene [1] | 30 | 1.25 | 1,1-dichlorocyclopropane. |
| VI | Pentamethylene sulfone | NaOH | $CHF_2Cl$ | Propylene [1] | 30 | 1.50 | 1,1-difluoro-2-methyl cyclopropane. |
| VII | 1,4-dithiacyclohexane-1,1,4,4-tetraoxide. | LiOH | $CHBrCl_2$ | Isobutylene [1] | 30 | 1.50 | 1,1-dichloro-2,2-dimethyl cyclopropane. |
| VIII | Hexamethylene sulfone | KOH | $CHCl_3$ | Styrene | 150 | 1.50 | 2-phenyl-1,1-dichlorocyclopropane. |
| IX | Tetramethylene sulfone | NaOH | $CHCl_3$ | 1-hexene | 65 | 1.50 | 2-butyl-1,1-dichlorocyclopropane. |

[1] Elevated pressures required. All runs are conducted under initially anhydrous conditions and with an excess of hydroxide.

The art suggests many uses for adducts of dihalocarbene, for instance, the Journal of the American Chemical Society, vol. 81, page 2579 (1959) discloses that the adducts formed from ketene acetals are readily pyrolyzed to alpha-chloroacrylic esters. Also in the Journal of the American Chemical Society, vol. 83, page 603 (1961) discloses the formation of chlorotropones by the elimination of methyl chloride from the dichlorocarbene adduct of methoxy naphthalene. The Journal of the American Chemical Society, vol. 82, page 4085 (1960) discloses a synthesis of 2,3-dihydro-6-chlorooxypine and 2,3-dihydrooxypine which involves the reaction of dichlorocarbene with hydropyran followed by pyrolysis of the cyclopropane adduct.

What I claim as new and desire to secure by Letters Patent of the United States is as follows:

1. A process involving the generation of dihalocarbene and the proximate formation of dihalocarbene adducts which comprises the step of reacting together an initially essentially anhydrous mixture of an alkali metal hydroxide, a haloform, and a dihalocarbene acceptor in a cyclic sulfone solvent for the organic components of said mixture; said haloform containing at least 1 halogen atom selected from the group consisting of chlorine and bromine and said sulfone having a ratio of carbon atoms to sulfone groups of less than about 10:1 and being selected from the group consisting of (1) thiacycloalkane dioxide, (2) dithiacycloalkane, and (3) thiacycloalkene dioxide.

2. The process of claim 1 wherein said ratio of carbon atoms to sulfone groups is less than about 8:1.

3. The process of claim 1 wherein said sulfone is tetramethylene sulfone.

4. A process involving the generation of dihalocarbene and the proximate formation of dihalocarbene adducts which comprises reacting together an initially essentially anhydrous mixture of sodium hydroxide, chloroform, and a dihalocarbene acceptor in tetramethylene sulfone solvent for the organic components of said mixture; and minimizing the effect of the water generated in the reaction by charging the reactor with a molar excess of sodium hydroxide over the moles of chloroform employed, the molar ratio of sodium hydroxide to chloroform thus being greater than 1:1.

5. The process of claim 4 wherein the average particle size of the sodium hydroxide is in the range of from about 50 to about 500 microns.

6. A process involving the generation of dihalocarbene and the proximate formation of dihalocarbene adducts which comprises the step of reacting together at a temperature within the range of from about 0° C. to about 250° C. an initially essentially anhydrous mixture comprising an alkali metal hydroxide, a haloform and a dihalocarbene acceptor in a cyclic sulfone solvent; said haloform containing at least one halogen atom selected from the group consisting of chlorine and bromine and said sulfone having a ratio of carbon atoms to sulfone groups of less than about 10:1 and being selected from the group consisting of (1) thiacycloalkane dioxide, (2) dithiacycloalkane, and (3) thiacycloalkene dioxide.

7. The process of claim 1 wherein said metal hydroxide is sodium hydroxide and said haloform is chloroform and wherein said dihalocarbene acceptor contains at least one aliphatic double bond.

8. A process for the preparation of dihalocarbene adducts which comprises effecting a reaction between finely divided sodium hydroxide and chloroform at a temperature in the range of from about 20° C. to about 110° C. in an initially anhydrous cyclic sulfone reaction medium additionally containing, a dihalocarbene acceptor, and the the carbon-to-nitrogen triple bond, said sulfone having a ratio of carbon atoms to sulfone groups of from about 3:1 to about 6:1 and being selected from the group consisting of (1) thiacycloalkane dioxide, (2) dithiacycloalkane, and (3) thiacycloalkene dioxide, the molar ratio of the sodium hydroxide to the chloroform being within the range of from about 1.5:1 to about 5:1.

References Cited by the Examiner

Doering et al., "J. Am. Chem. Soc.," vol. 76, pp. 6162–64 (1954).

LEON ZITVER, *Primary Examiner.*

K. H. JOHNSON, K. V. ROCKEY, *Assistant Examiners.*